United States Patent
Bajpay et al.

(10) Patent No.: US 7,630,325 B1
(45) Date of Patent: Dec. 8, 2009

(54) METHODS FOR RECONCILING TRUNK GROUP IDENTIFICATION INFORMATION AMONG VARIOUS TELECOMMUNICATION NETWORK MANAGEMENT SYSTEMS

(75) Inventors: Paritosh Bajpay, Edison, NJ (US);
Robert Best, Highlands Ranch, CO (US); Hossein Eslambolchi, Los Altos Hills, CA (US); Richard Glozzy, Hackettstown, NJ (US); John McCanuel, Bailey, CO (US); Richard Simon, Overland Park, KS (US)

(73) Assignee: AT&T Corp., New York, NY (US)

( * ) Notice: Subject to any disclaimer, the term of this patent is extended or adjusted under 35 U.S.C. 154(b) by 660 days.

(21) Appl. No.: 11/319,181

(22) Filed: Dec. 28, 2005

(51) Int. Cl.
*H04L 12/28* (2006.01)

(52) U.S. Cl. .......................... 370/254; 370/352; 714/57

(58) Field of Classification Search ................. 370/389, 370/356, 254, 32.021; 707/104.1
See application file for complete search history.

(56) References Cited

U.S. PATENT DOCUMENTS

| | | | |
|---|---|---|---|
| 5,687,224 A | 11/1997 | Alley, Jr. et al. | |
| 5,761,432 A | 6/1998 | Bergholm et al. | |
| 5,835,580 A | 11/1998 | Fraser | |
| 5,875,242 A | 2/1999 | Glaser et al. | |
| 6,134,560 A | 10/2000 | Kliebhan | |
| 6,169,793 B1 * | 1/2001 | Godwin et al. | 379/221.13 |
| 6,295,540 B1 | 9/2001 | Sanschagrin et al. | |
| 6,493,727 B1 | 12/2002 | Huang et al. | |
| 6,636,877 B1 | 10/2003 | Doleac et al. | |
| 6,662,015 B2 * | 12/2003 | Furlong | 455/456.5 |
| 6,678,370 B1 | 1/2004 | Freebersyser et al. | |
| 6,771,758 B1 | 8/2004 | Sandel et al. | |
| 6,820,088 B1 | 11/2004 | Hind et al. | |
| 6,877,008 B1 | 4/2005 | Kirkpatrick et al. | |
| 6,891,937 B1 | 5/2005 | Kuhn et al. | |
| 6,944,657 B1 | 9/2005 | Taghadoss | |
| 7,263,533 B2 * | 8/2007 | Bauer et al. | 707/104.1 |
| 2003/0133436 A1 | 7/2003 | Patel et al. | |
| 2005/0068950 A1 | 3/2005 | Ellis et al. | |
| 2005/0169260 A1 | 8/2005 | Andrews et al. | |
| 2005/0216380 A1 | 9/2005 | Morris et al. | |

* cited by examiner

*Primary Examiner*—Dang T Ton
*Assistant Examiner*—Li Zhou (57) ABSTRACT

A method includes retrieving a first data set from a switch within a network, the first data set including a set of switch records. Among the switch records included in the first data set is a first switch record associated with and including a field identifying a first trunk group from a set of trunk groups included within the switch. A second data set is retrieved from a configuration management system configured to facilitate an operation associated with the network. The second data set includes a plurality of configuration records, which includes a first configuration record associated with and including a field identifying the first trunk group. When the field included in the first configuration record differs from the field included in the first switch record a report is produced.

2 Claims, 4 Drawing Sheets

METHODS FOR RECONCILING TRUNK GROUP IDENTIFICATION INFORMATION AMONG VARIOUS TELECOMMUNICATION NETWORK MANAGEMENT SYSTEMS

CROSS-REFERENCE TO RELATED APPLICATIONS

This application is related to U.S. patent application Ser. No. 11/319,218, entitled "Methods for Reconciling Discrepancies in Circuit Information Among Various Telecommunications Network Management Systems," filed on even date herewith, which is incorporated herein by reference in its entirety.

BACKGROUND

The invention relates generally to communication networks and methods, and more particularly to methods and systems for reconciling trunk group information among various telecommunication network management systems.

Telecommunications service providers use many different types of network facilities and circuits to provide a variety of telecommunication services. Such services can include, for example, providing "800 service" for a given end user location within the Plain Old Telephone Service ("POTS") network and providing access to an internet protocol ("IP") network. When an end user requires such service, a connection from the end user's equipment to a network must be established. This often involves designing an appropriate circuit to establish a path from the customer site to an edge switch within a network, assigning available network facilities, such as switch ports and transmission lines, for use in building the circuit, and connecting or establishing the designed circuit.

Service providers generally employ various known management systems to facilitate establishing, allocating and/or modifying circuits to connect an end user's equipment to an edge switch within a network. For example, an ordering database can include the details about the end user's service request, such as the bandwidth desired, the features desired, and the point of origination. An inventory database can include a listing of ports and trunk groups within an edge switch that are available for connecting the end user's equipment to the network. A provisioning system can be used to establish a circuit to fulfill the service request by making the necessary software assignments to connect a group of facilities. Finally, a billing system can be used to facilitate the billing activity associated with the established circuit.

Some known network management systems use information characterizing the facilities included within a network, such as a switch location and an identity of the transmission lines included therein, to carry out their desired functions. Such information can include, for example, a common language facility code (CLFI™ code) that identifies a particular switch and/or a base traffic number ("BTFN") that identifies a trunk group within a particular switch. Such information can be used, for example, to identify a trunk group that serves a particular end user to facilitate changes in service requested by the end user.

In some instances, such information is maintained in a central database, which is accessed by the various network management systems. In other instances, however, the network management systems do not share common data, but rather individually maintain records characterizing the network facilities. For example, some known switches maintain a database containing the information associated with the trunk groups included therein. This information is also separately maintained in various known management systems.

In arrangements where individual databases are maintained, discrepancies can exist between information maintained within a switch database and information maintained within the various network management systems. Such discrepancies can be caused by errors in the data input process, errors in transmitting data from a switch to a network management system, and the like. Known network management systems do not periodically review the status of information contained therein to ensure that such information is consistent with the information maintained in the switches. Thus, a need exists for methods and systems for reconciling information characterizing the trunk groups included within a network between a switch and various telecommunication network management systems.

SUMMARY

A method includes retrieving a first data set from a switch within a network, the first data set including a set of switch records. Among the switch records included in the first data set is a first switch record associated with and including a field identifying a first trunk group from a set of trunk groups included within the switch. A second data set is retrieved from a configuration management system configured to facilitate an operation associated with the network. The second data set includes a plurality of configuration records, which includes a first configuration record associated with and including a field identifying the first trunk group. When the field included in the first configuration record differs from the field included in the first switch record a report is produced.

In some embodiments, the method further includes updating automatically the second data set to replace the field included in the first configuration record with the field included in the first switch record. The updated second data set is then transmitted to the configuration management system.

DETAILED DESCRIPTION

A method includes retrieving a first data set from a switch within a network, the first data set including a set of switch records. Among the switch records included in the first data set is a first switch record associated with and including a field identifying a first trunk group from a set of trunk groups included within the switch. A second data set is retrieved from a configuration management system configured to facilitate an operation associated with the network. The second data set includes a set of configuration records, which includes a first configuration record associated with and including a field identifying the first trunk group. When the field included in the first configuration record differs from the field included in the first switch record a report is produced.

In some embodiments, the above described method further includes updating automatically the second data set to replace the field included in the first configuration record with the field included in the first switch record. The updated second data set is then transmitted to the configuration management system. In this manner, the trunk group identification information included within the first and second data sets is reconciled.

In some embodiments, a method includes retrieving a first data set from a switch within a network. The first data set includes a set of switch records, each of which is associated with a trunk group from a set of trunk groups included within the switch. Among the set of switch records is a first switch record associated with a first trunk group from the set of trunk groups. A second data set is retrieved from a configuration management system configured to facilitate an operation associated with the network. The second data set includes a set of configuration records, each of which is associated with a trunk group from the set of trunk groups included within the above mentioned switch. When the second data set does not include a configuration record that is associated with the first trunk group, a report is produced.

In some embodiments, the above described method further includes updating automatically the second data set to include a configuration record associated with the first trunk group. The updated second data set is then transmitted to the configuration management system. In this manner, the trunk group identification information included within the first and second data sets is reconciled.

The term "circuit" or "network circuit" is used herein to mean a communication path between two or more nodes that is established by interconnecting a set of network facilities. A circuit can be physical in nature, including items such as the transmission lines, switches and/or other physical network facilities that are connected to establish a communication path between network nodes. Alternatively, a circuit can be virtual in nature, including items such as software identifiers associated with switch ports, the software identifiers being allocated to establish a communication path between network nodes.

The term "trunk group" is used herein to include a grouping of transmission lines having similar properties, such as a beginning destination, an end destination, and/or a type of service provided by the trunk group. A unique identifier is often assigned to each trunk group thereby allowing a switch or other network management systems to identify the trunk group. Such an identifier can include, for example, a common language location code (CLLI™ code) associated with a switch that includes the trunk group, a numeric code identifying the trunk group, and/or a combination of one or more CLLI™ codes and a numeric code. The numeric code identifying a trunk group is often referred to as a base traffic number ("BTFN"). In instances when an entire trunk group is used to establish a circuit connecting an end user to an edge switch within a network, the trunk group identifier can be used to identify the circuit. These terms are explained further with reference to FIG. 1.

Figure 1:
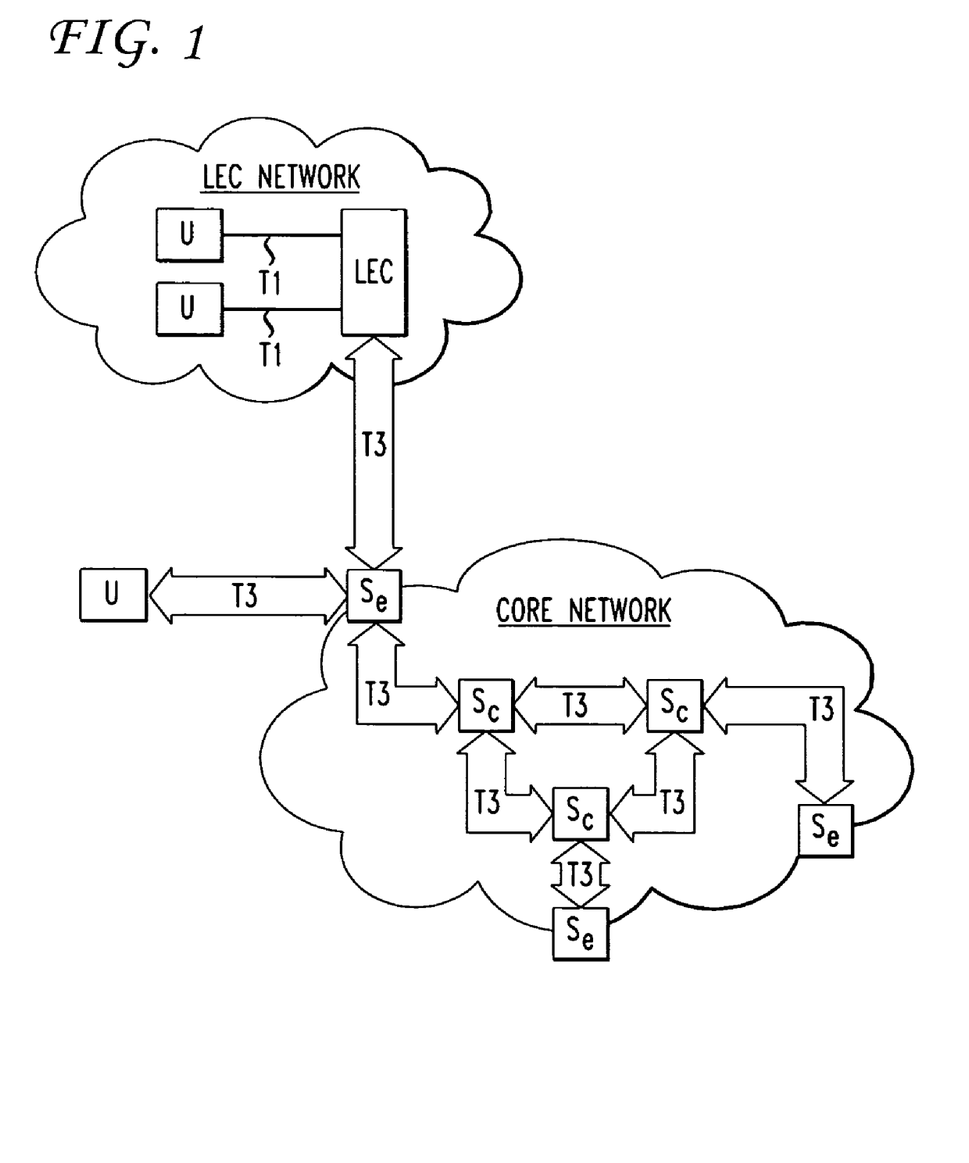
FIG. 1 is a schematic illustration of various circuits residing within and between a core network and an end user.

FIG. 1 is a schematic illustration of various network facilities and circuits included within and providing access to a core network, such as a network managed by an inter-exchange carrier ("IXC"). As illustrated, the core network includes a series of edge switches, labeled as $S_e$, and core switches, labeled as $S_c$, that are interconnected by a series of transmission lines T3. The transmission lines T3 can be, for example, high-bandwidth T3 trunk lines. Although each pair of edge switches $S_e$ and core switches $S_c$ is illustrated as being interconnected by a single transmission line T3, in reality the switches are interconnected by many groups of transmission lines (i.e., trunk groups).

As illustrated in FIG. 1, an end user U can gain access to the core network either directly or via a LEC network. When gaining access via a LEC network, the end user's equipment U is connected to a LEC office by a transmission line T1, which can be, for example a T1 trunk line. The LEC office, in turn, provides a connection to an edge switch $S_e$ within the core network via a transmission line T3, which can include the signals from multiple end users U. Although the connection between the LEC office and the edge switch $S_e$ is illustrated as including a single transmission line T3, such a connection often includes multiple trunk groups. For example, one trunk group can include those circuits for 800 service is required, while another trunk group can include those circuits for which another type of special service is required.

When gaining access to the core network directly, the end user's equipment U is connected directly to an edge switch $S_e$ within the core network. As illustrated, the connection can be made via a transmission line T3, which can be, for example, a high bandwidth T3 trunk line. As described above, such a connection often includes multiple trunk groups. Such "direct connect" circuits are often used when the end user is a large customer requiring a high volume of circuits.

As discussed above, the service provider can employ a variety of network management systems to ensure that trunk groups included within each switch are efficiently used and are generating revenue. Such network management systems often employ information characterizing and identifying the trunk groups to carry out their desired functions. The effectiveness of the network management systems is diminished when discrepancies exist in the information maintained by a switch and that maintained in a network management system. For example, when a provisioning system contains a trunk group identifier that does not match the trunk group identifier contained in the switch, certain provisioning operations may not be automatically executed.

Figure 2:
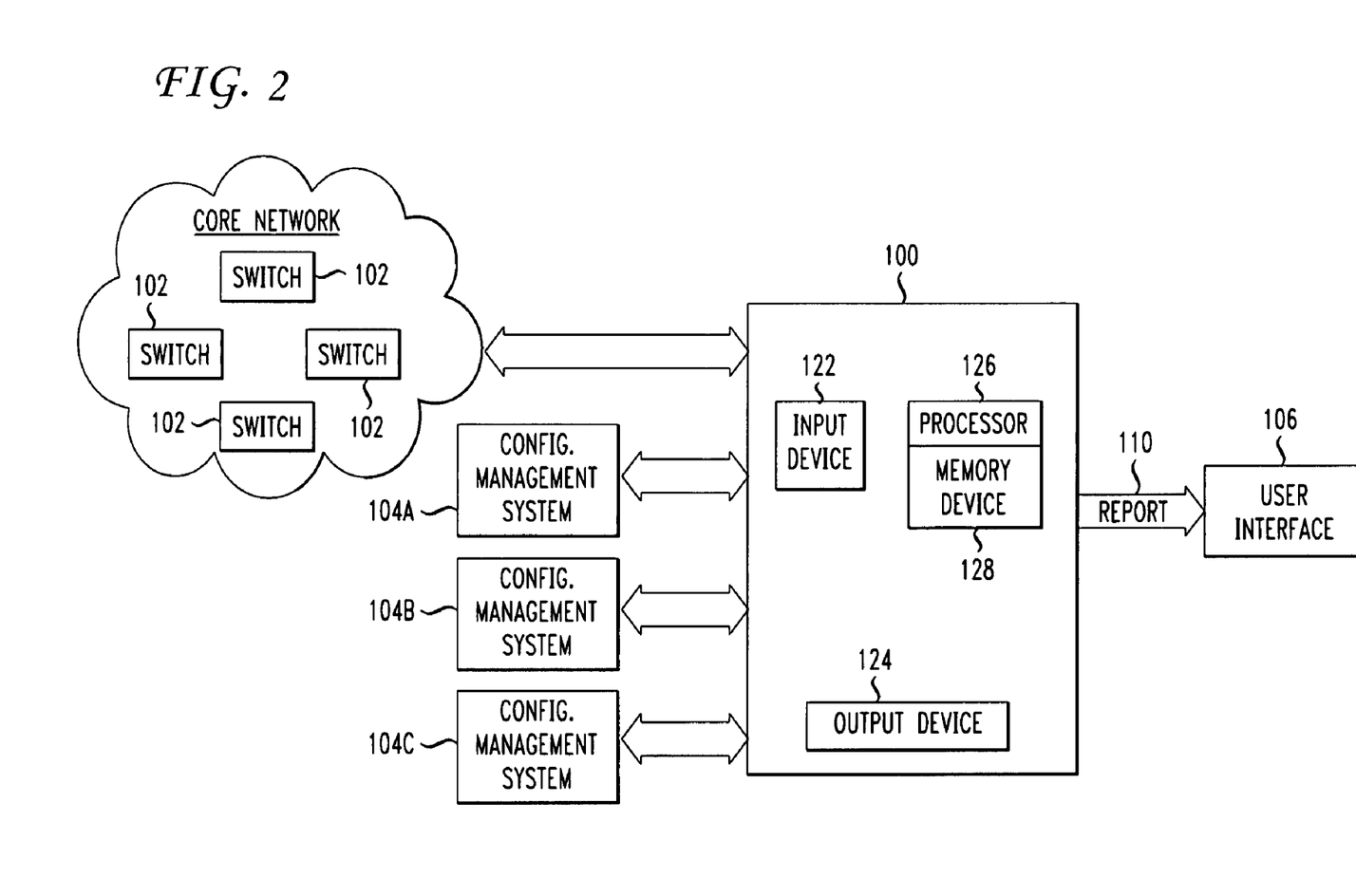
FIG. 2 is a schematic illustrating a system for reconciling trunk group identification information between a switch and various telecommunication network management systems according to an embodiment of the invention.

FIG. 2 is a schematic illustration of an information reconciliation system 100 for reconciling trunk group identification information between a switch and various telecommunication network management systems according to an embodiment of the invention. The information reconciliation system 100 includes a processor 126 and a memory device 128. The illustrated information reconciliation system 100 also includes an input device 122 configured to receive input from an external source, such as configuration management system 104 or a switch 102, as described below. Similarly, the information reconciliation system 100 includes an output device 124 configured to provide output to an external device, such as a configuration management system 104 or a user interface 106, as described below.

The information reconciliation system 100 is configured to receive a first data set from a switch 102 included within a core network. The first data set includes a set of switch records, each of which is associated with and includes a field containing a trunk group identifier that uniquely identifies a trunk group included within the switch 102. As discussed above, the trunk group identifier can include, for example, a common language location code (CLLI™ code) identifying one or more switches 102 served by the trunk group, a BTFN, and/or a combination of one or more CLLI™ codes and a BTFN. For example, in some embodiments, a trunk group identifier includes a CLLI™ code identifying the switch at which the trunk group originates, a CLLI™ code identifying the facility where the trunk group terminates, and a BTFN. An example of such a format is given below:

SNJSCA0241TSNTDCABXN021001

Where SNJSCA identifies the originating switch as being located in San Jose, Calif.; 0241T identifies the originating switch within the San Jose office; SNTDCA identifies the terminating point as being located in Santa Clara, Calif.; BXN021 identifies the type of facility in which the trunk group terminates; and 1001 is the BTFN associated with the trunk group.

In addition to the field containing the trunk group identifier, each of the switch records can include additional fields containing information characterizing the trunk group. Such information can include, for example, the end user associated with a trunk group and/or the type of service provided by the trunk group.

In some embodiments, the information reconciliation system 100 receives the first data set automatically. For example, the information reconciliation system 100 can be configured to automatically download a first data set from a switch 102 at various predetermined times. Alternatively, the information reconciliation system 100 can be configured to issue an instruction to a switch 102 to request that the switch 102 transmit the first data set. A user can prompt such an instruction, for example, by specifying the switch 102 from which the first data set is to be received, via a user interface 106.

To ensure that the first data set is of a manageable size, in some embodiments, the information reconciliation system 100 is configured to select a candidate set of trunk groups for which switch records are to be received from the switch 102. A candidate set of trunk groups can include, for example, all trunk groups originating within a switch 102 that are used to provide direct connect circuits from an end user to a core network. In some embodiments, a user can specify the criteria for defining a candidate set of trunk groups via a user interface 106.

Upon receiving the first data set, the information reconciliation system 100 then receives a second data set from a configuration management system 104. The configuration management system 104 can include a variety of different systems, labeled as 104A, 104B, and 104C, configured to facilitate various operations associated with the network. For example, the configuration management system 104 can be a centralized database system for maintaining network topology information.

The second data set includes a set of configuration records, each of which is associated with and includes a field containing a trunk group identifier that uniquely identifies a trunk group included within the switch 102. As described above, the trunk group identifier can include a common language location code and/or a BTFN for uniquely identifying each trunk group. Each of the configuration records can include additional fields containing information characterizing the trunk group. Such information can be the same as or different from the information contained in the switch records. Information included in the configuration records can include, for example, the total bandwidth associated with the trunk group, a date upon which the trunk group was connected, and/or billing information pertaining to the trunk group.

In some embodiments, the information reconciliation system 100 receives the second data set automatically. For example, the information reconciliation system 100 can be configured to automatically download a second data set associated with the same subset of trunk groups for which the first data set was received. In this manner, the first data set and second data sets are associated with the same subset of trunk groups. In other embodiments, the information reconciliation system 100 is configured to require input from a user via a user interface 106 prior to receiving the second data set.

Upon receiving both the first data set and the second data set, the information reconciliation system 100 compares the two data sets to determine whether a discrepancy exists between the trunk group identifier included in a switch record associated with a trunk group and the trunk group identifier included in a configuration record associated with the same trunk group. In some embodiments, the information reconciliation system 100 employs a rules-based algorithm to identify such "mismatch-type" discrepancies, and to ensure that the identified switch record and the identified configuration record are associated with the same circuit. For example, the information reconciliation system 100 can determine that a mismatch-type discrepancy exists if a specific number of predetermined criteria are met. Such criteria can include whether a portion of the trunk group identifier from a switch record matches a portion of the trunk group identifier from a configuration record, whether a record date associated with a switch record matches or is close to a record date associated with a configuration record, and/or the whether the number of fields within a switch record that match the corresponding fields within a configuration record exceeds a predetermined threshold.

When a mismatch-type discrepancy is identified, the information reconciliation system 100 produces a report 110. The report can be produced in a variety of different formats, such as ASCII format, binary format, or as a data file attached to an e-mail. As illustrated, the report is transmitted to a user interface 106. In this manner, the information reconciliation system 100 notifies a user (not shown in FIG. 2) that a discrepancy exists.

In some embodiments, the information reconciliation system 100 is configured to update the erroneous trunk group identifier included in the configuration record with the correct trunk group identifier from the switch record. In this manner, the trunk group information contained within the configuration management system 104 is reconciled with the trunk group information contained within the switch 102. In some embodiments, the configuration record is updated by directly changing the second data set and transmitting the data set to the configuration management system 104. In other embodiments, the configuration record is updated by issuing an instruction to the configuration management system 104 to modify the database resident therein.

In addition to determining whether mismatch-type discrepancies exist, the information reconciliation system 100 also compares the two data sets to determine whether the first data set contains a switch record associated with a trunk group for which no configuration record exists in the second data set. Such "missing record" discrepancies can occur, for example when an order for service is partially processed or when errors occur in transmitting data between various network management systems. For example, an error in data transmission may result in the improper removal of a record from a billing system while the corresponding switch record and trunk group assignment remains resident within the switch. In some embodiments, the information reconciliation system 100 employs a rules-based algorithm to identify such "missing record" discrepancies, as discussed above. In instances when a switch record exists without a corresponding configuration record, the information reconciliation system 100 produces a report 110, as described above.

In some embodiments, the information reconciliation system 100 is configured to update the second data set to include a configuration record associated with the trunk group identified in the first data set. In other embodiments, the information reconciliation system 100 issues an instruction to the configuration management system 104 to establish the appropriate configuration record. In this manner, the trunk group information contained within the configuration management system 104 is reconciled with the trunk group information contained within the switch 102.

The illustrated information reconciliation system 100 includes a processor 126 and a memory device 128. The processor 126 can be a commercially-available processing device configured to perform one or more specific tasks. For example, the processor 126 can be a commercially-available microprocessor. Alternatively, the processor 126 can be an application-specific integrated circuit (ASIC) or a combination of ASICs, which are designed to perform one or more specific functions. In yet other embodiments, the processor 126 can be an analog or digital circuit, or a combination of multiple circuits.

The memory device 128 can include one or more types of memory. For example, the memory device 128 can include a read only memory (ROM) component and a random access memory (RAM) component. The memory device 128 can also include other types of memory suitable for storing data in a form retrievable by the processor 126, for example, electronically programmable read only memory (EPROM), erasable electronically programmable read only memory (EEPROM), or flash memory.

Although the information reconciliation system 100 is illustrated and described as including a processor 126, a memory device 128, an input device 122 and an output device 124, in some embodiments, the system can include software in the form of processor-readable code instructing a processor to perform the functions described herein. The processor-readable medium storing code representing instructions to cause a processor to perform a process may include one or more type of memory, for example the memory device ROM or RAM. In other embodiments, the information reconciliation system 100 can include firmware that performs the functions described herein.

The operations performed by the information reconciliation system 100 can be done either automatically or manually. An operation is done automatically when it is done without human intervention. For example, in some embodiments, the information reconciliation system 100 determines automatically whether a mismatch-type discrepancy exists, by using a rules-based algorithm as described above. In other embodiments, however, the information reconciliation system 100 may require input from a user, such as selecting a set of rules, to determine whether a mismatch-type discrepancy exists.

Although the information reconciliation system 100 and the configuration management systems 104A, 104B, and 104C are shown and described above as being separate systems, in some embodiments, the functions of the information reconciliation system 100 can be incorporated into one or more of the configuration management systems 104.

Figure 3:
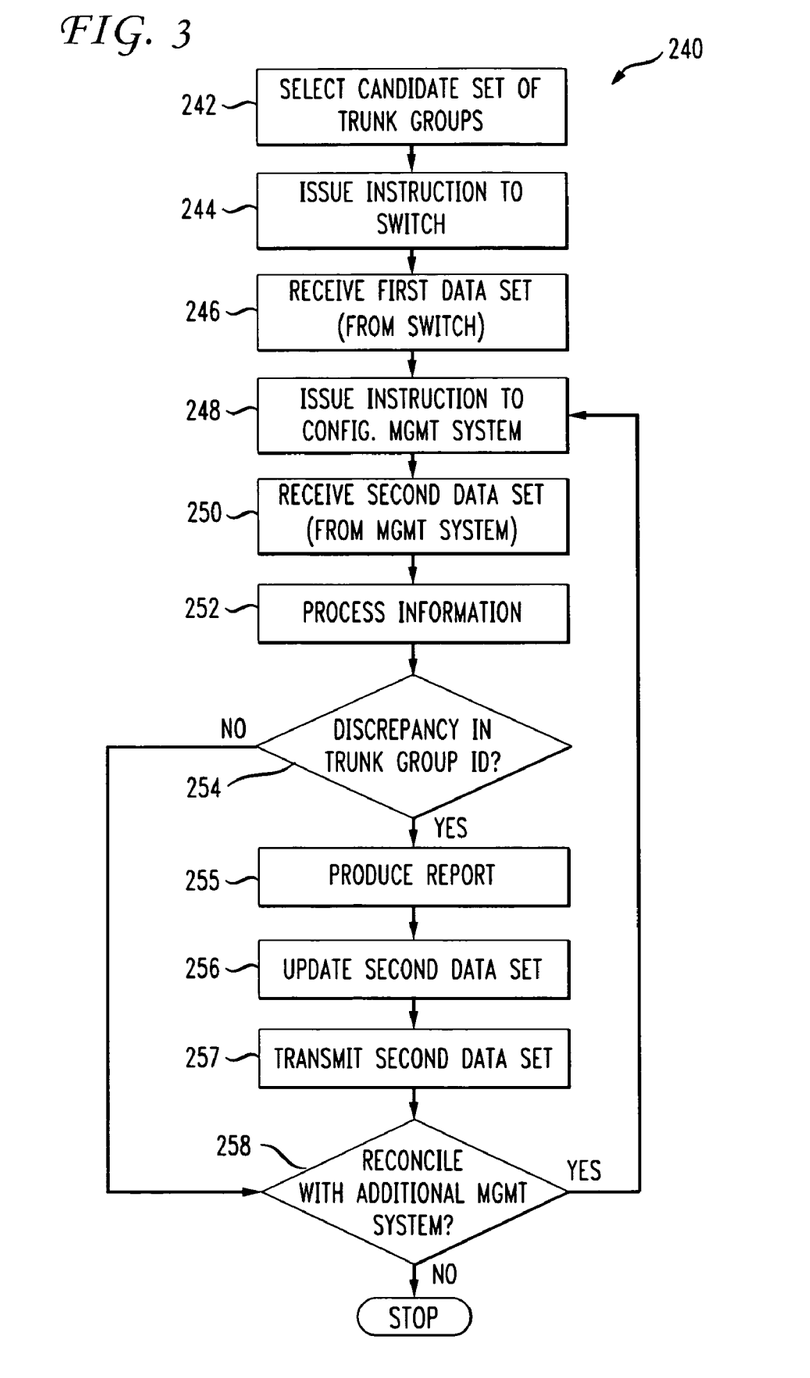
FIGS. 3 and 4 are flow charts illustrating methods for reconciling trunk group identification information between a switch and various telecommunication network management systems according to embodiments of the invention.

FIG. 3 is a flow chart illustrating a method 240 for reconciling mismatch-type discrepancies in trunk group identification information between a switch and various telecommunication network management systems according to an embodiment of the invention. The illustrated method includes selecting a candidate set of trunk groups to be analyzed according to the operations presented herein, 242. In some embodiments, a candidate set of trunk groups can include, for example, all trunk groups originating within a certain switch.

In other embodiments, a candidate set of trunk groups can include a subset of the trunk groups contained within a certain switch.

Once candidate set of trunk groups has been selected, the method includes issuing an instruction to retrieve a first data set from a switch, 244. Such an instruction can be in the form of a query to retrieve specific data from the switch. In some embodiments, the method includes issuing a single instruction to a switch. In other embodiments, the method includes issuing multiple instructions to a switch. In yet other embodiments, the first data set is received automatically from the switch without requiring that an instruction be issued.

The illustrated method then includes receiving a first data set from a switch, 246. As discussed above, the first data set includes a set of switch records, each of which is associated with and includes a field containing a trunk group identifier to uniquely identify a trunk group within the selected switch. As discussed above, the trunk group identifier can include, for example, a common language location code (CLLI™ code) identifying one or more switches 102 served by the trunk group, a BTFN, and/or a combination of one or more CLLI™ codes and a BTFN. In addition to the field containing the trunk group identifier, each of the switch records can also include additional fields containing information characterizing the trunk group. Such information can include, for example, the end user associated with a trunk group and/or the type of service provided by the trunk group.

In a similar fashion, the illustrated method includes issuing an instruction to retrieve a second data set from a configuration management system, 248, and receiving the second data set, 250. The second data set includes a set of configuration records, each of which is associated with and includes a field containing a trunk group identifier to uniquely identify a trunk group within the selected switch. Each of the configuration records can also include additional fields containing information characterizing the trunk group. Such information can be the same as or different from the information contained in the switch records. In some embodiments, the second data set is received automatically from a configuration management system without requiring that an instruction be issued.

Both the first and second data sets can be received in a variety of different formats. In some embodiments, the data sets are received in ASCII format. In other embodiments, the data sets are received in binary or any other machine-readable format.

Upon receiving the first and second data sets, the illustrated method includes processing the information therein, 252, and determining whether a discrepancy exists between the trunk group identifier included in a switch record associated with a trunk group and the trunk group identifier included in a configuration record associated with the same trunk group, 254. As discussed above, in some embodiments, determining whether a mismatch-type discrepancy exists is accomplished automatically using a rules-based algorithm.

When a mismatch-type discrepancy is discovered, the illustrated method includes producing a report, 255. In some embodiments, the report can be transmitted to a user interface, thereby notifying a user of the identified mismatch-type discrepancy. In other embodiments, the report can be in the form of an e-mail and/or an audible page to notify a user of the identified mismatch-type discrepancy. In yet other embodiments, the operation of producing a report is not required for the successful completion of the illustrated method.

The illustrated method also includes updating the erroneous trunk group identifier included in the configuration record with the correct trunk group identifier from the switch record, 256, and transmitting the updated second data set to the configuration management system, 257. In some embodiments, a method includes automatically updating and transmitting the second data set. In other embodiments, a method includes updating and transmitting the second data set only upon manual confirmation from a user. In yet other embodiments, the second data set is updated by issuing an instruction to the configuration system to modify the database resident therein.

The illustrated method then includes determining whether trunk group information contained in additional configuration management systems is to be reconciled, 258. When additional configuration management systems are to be reconciled, the method includes iteratively returning to operation 248.

Figure 4:
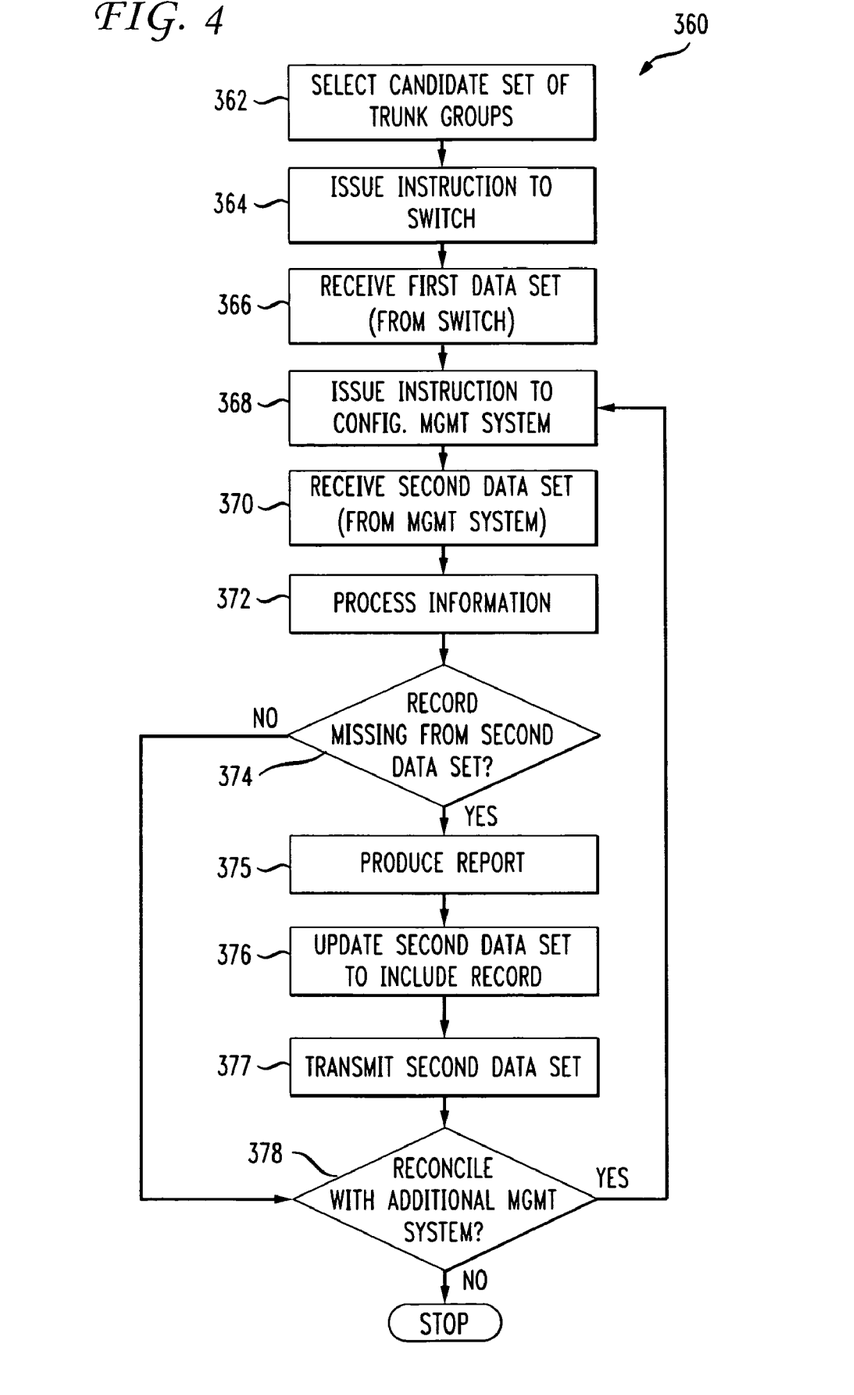

FIG. 4 is a flow chart illustrating a method 360 for reconciling missing record-type discrepancies in trunk group identification information between a switch and various telecommunication network management systems according to an embodiment of the invention. The illustrated method includes many operations that are similar or analogous to those discussed above in reference to the method 240. The illustrated method includes selecting a candidate set of trunk groups, 362. As described above, once the candidate set of trunk groups has been selected, the method includes issuing an instruction to retrieve a first data set from a switch, 364, and receiving a first data set in a format as described above, 366. Similarly, the illustrated method includes issuing an instruction to retrieve a second data set from a configuration management system, 368, and receiving the second data set in a format as described above, 370. In some embodiments, the first data set, the second data set, or both can be received automatically from without requiring that an instruction be issued.

Upon receiving the first and second data sets, the illustrated method includes processing the information therein, 372, and determining whether the first data set contains a switch record associated with a trunk group for which no configuration record exists in the second data set, 374. As discussed above, this determination can be made using a rules-based algorithm.

When a missing record-type discrepancy is discovered, the illustrated method includes producing a report, 375, of the type disclosed above. In some embodiments, the operation of producing a report is not required for the successful completion of the illustrated method.

The illustrated method also includes updating the second data set to include a configuration record associated with the trunk group identified in the first data set for which no configuration record currently exists, 376, and transmitting the updated second data set to the configuration management system, 377. In some embodiments, a method includes automatically updating and transmitting the second data set. In other embodiments, a method includes updating and transmitting the second data set only upon manual confirmation from a user. In other embodiments, the second data set is updated by issuing an instruction to the configuration system to modify the database resident therein. In yet other embodiments, the operations of updating the second data set and transmitting the updated data set to a configuration management system are not required for the successful completion of the illustrated method.

As discussed above, the illustrated method also includes determining whether an additional configuration management system is to be reconciled, 378, and iteratively returning to operation 368.

CONCLUSION

While various embodiments of the invention have been described above, it should be understood that they have been presented by way of example only, and not limitation. For example although the above methods are shown and described above as a series of operations occurring in a particular order, in some embodiments, certain operations can be completed in a parallel fashion. In other embodiments, the operations can be completed in an order that is different from that shown and described above.

What is claimed is:

1. A processor-readable medium storing code representing instructions to cause a processor to perform a process, the code comprising code to:

retrieve a first data set from a switch within a network, the first data set including a plurality of switch records, the plurality of switch records including a first switch record associated with a first trunk group from a plurality of trunk groups included within the switch, the first switch record including a base traffic number associated with the first trunk group;

retrieve a second data set from a configuration management system configured to facilitate an operation associated with the network, the second data set including a plurality of configuration records, the plurality of configuration records including a first configuration record associated with the first trunk group, the first configuration record including a base traffic number associated with the first trunk group;

determine, using a rules-based algorithm, whether the base traffic number included in the first configuration record differs from the base traffic number included in the first switch record;

produce a report when the base traffic number included in the first configuration record differs from the base traffic number included in the first switch record; and produce a report when the first data set includes a switch record associated with a second trunk group from the plurality of trunk groups and the second data set does not include a configuration record associated with the second trunk group.

2. A processor-readable medium storing code representing instructions to cause a processor to perform a process, the code comprising code to:

retrieve a first data set from a switch within a network, the first data set including a plurality of switch records, the plurality of switch records including a first switch record associated with a first trunk group from a plurality of trunk groups included within the switch, the first switch record including a base traffic number associated with the first trunk group;

retrieve a second data set from a configuration management system configured to facilitate an operation associated with the network, the second data set including a plurality of configuration records, the plurality of configuration records including a first configuration record associated with the first trunk group, the first configuration record including a base traffic number associated with the first trunk group;

determine, using a rules-based algorithm, whether the base traffic number included in the first configuration record differs from the base traffic number included in the first switch record;

produce a report when the base traffic number included in the first configuration record differs from the base traffic number included in the first switch record;

produce a report when the first data set includes a switch record associated with a second trunk group from the plurality of trunk groups and the second data set does not include a configuration record associated with the second trunk group;

update the second data set to include a configuration record associated with the second trunk group; and transmit the second data set to the configuration management system.

* * * * *